United States Patent [19]

Kuwabara et al.

[11] Patent Number: 5,382,554
[45] Date of Patent: * Jan. 17, 1995

[54] HIGH-PACKING SILICON NITRIDE POWDER AND METHOD FOR MAKING

[75] Inventors: Haruyoshi Kuwabara; Akio Otsuka, Gunma; Meguru Kashida, Annaka, all of Japan

[73] Assignee: Shin-Etsu Chemical Co., Ltd., Tokyo, Japan

[ * ] Notice: The portion of the term of this patent subsequent to Sep. 20, 2011 has been disclaimed.

[21] Appl. No.: 150,351

[22] Filed: Nov. 10, 1993

Related U.S. Application Data

[63] Continuation of Ser. No. 852,559, Mar. 17, 1992, abandoned.

[30] Foreign Application Priority Data

Mar. 18, 1991 [JP] Japan .................................. 3-078588

[51] Int. Cl.⁶ .............................................. C04B 35/58
[52] U.S. Cl. ............................................ 501/97; 501/94; 501/96; 264/65; 423/353
[58] Field of Search .................. 501/94, 96, 97, 95; 264/65; 423/324, 344, 349, 351, 353, 385, 406

[56] References Cited

U.S. PATENT DOCUMENTS

| | | | |
|---|---|---|---|
| 4,440,707 | 4/1984 | Shimamori et al. | 264/65 |
| 4,517,168 | 5/1985 | Kawahito et al. | 423/344 |
| 4,521,358 | 6/1985 | Miura et al. | 264/65 |
| 4,716,133 | 12/1987 | Horiuchi et al. | 501/97 |
| 4,923,829 | 5/1990 | Yasutomi et al. | 501/95 |

*Primary Examiner*—Karl Group
*Assistant Examiner*—Michael Marcheschi
*Attorney, Agent, or Firm*—McAulay Fisher Nissen Goldberg & Kiel

[57] ABSTRACT

High-packing silicon nitride powder having a tap density of at least about 0.9 g/cm³ is prepared by reacting a metallic silicon powder having a mean particle size of about 1 to 10 μm, a BET specific surface area of about 1 to 5 m²/g, and a purity of at least about 99% with nitrogen in a nitrogen atmosphere containing about 5 to 20% by volume of hydrogen at about 1,350 to 1,450° C., and milling the resulting silicon nitride powder in a dry attritor. The powder is moldable into a compact having a density of at least about 1.70 g/cm³, from which a sintered part having improved dimensional precision and strength is obtained.

2 Claims, 3 Drawing Sheets

HIGH-PACKING SILICON NITRIDE POWDER AND METHOD FOR MAKING

This is a continuation of Ser. No. 07/852,559, filed Mar. 17, 1992, now abandoned.

This invention relates to a silicon nitride powder having a high packing density and thus moldable into a high density compact and a method for preparing the same.

BACKGROUND OF THE INVENTION

Recently, silicon nitride draws attention because of its heat resistance, strength, and corrosion resistance. End products are generally obtained by molding silicon nitride powder into a compact of desired shape and sintering the compact. If the molded compact were increased in density, the sintered product would also have an increased density with less shrinkage, which is advantageous in strength and dimensional precision.

Silicon nitride powder is conventionally prepared by silica reduction, imide decomposition or direct nitriding of metallic silicon powder. Silicon nitride powders obtained by these conventional methods are molded into compacts, which cannot be increased in density beyond a certain limit, for example, in excess of 1.70 g/cm$^3$.

SUMMARY OF THE INVENTION

Therefore, an object of the present invention is to provide a novel and improved silicon nitride powder having a high packing density and thus moldable into a high density compact from which a sintered product having improved strength and dimensional precision is obtained. Another object of the present invention is to provide a method for preparing such a high-packing silicon nitride powder.

The inventors have found that by reacting a silicon nitride powder resulting from the direct nitriding method, especially a metallic silicon powder having a mean particle size of about 1 to 10 $\mu$m, a BET specific surface area of about 1 to 5 m$^2$/g, and a purity of at least 99% with nitrogen in a nitrogen atmosphere containing about 5 to 20% by volume of hydrogen at a temperature of about 1,350° to 1,450° C., and comminuting the resulting silicon nitride powder in a dry ball agitating mill, there is obtained a high-packing silicon nitride powder containing at lease 95% by weight of particles having an aspect ratio of up to 3, substantially free of acicular (needle-shaped) particles, and having a tap density of at least 0.9 g/cm$^3$.

Silicon nitride particles produced by the direct nitriding methods generally contain a substantial proportion of acicular particles which not only tend to cause pneumoconiosis, but can be molded into compacts of reduced density. One apparent approach is to remove acicular particles by classification, but is low in the yield of effective silicon nitride. Simple removal of acicular particles by classification does not ensure that the remaining silicon nitride powder be highly packing. Investigating how the density of silicon nitride powder compacts is affected by the powder-forming reaction conditions and related to the packing density and aspect ratio of the powder, the inventors have found that when silicon nitride powder including acicular particles as prepared by the direct nitriding method is milled by means of a dry agitating mill, for example, a dry attritor, where the silicon nitride powder is dry comminuted while increasing the grinding ability as by controlling the powder charge, there is obtained a silicon nitride powder containing at least 95% by weight of particles having an aspect ratio of up to 3. The high content of low aspect ratio particles means that the content of acicular particles is substantially reduced so that a health problem is eliminated. Then substantially the entire amount of silicon nitride is recovered. In addition, the resultant silicon nitride powder has a high packing density. That is, there is obtained a high-packing silicon nitride powder having a tap density of at least 0.9 g/cm$^3$, which could not be conventionally achieved. This silicon nitride powder can be molded into a compact having a density as high as 1.70 g/cm$^3$or more, which can, in turn, be fired into a sintered body having an increased density and improved dimensional precision. The sintered body is also improved in strength and other physical properties because the high-packing silicon nitride powder has a large specific surface area.

Therefore, according to the present invention, there is provided a high-packing silicon nitride powder having a tap density of at least about 0.9 g/cm$^3$. Preferably, the powder contains at least about 95% by weight of particles having an aspect ratio of up to about 3. It is to be noted that the tap density is measured by charging a cylindrical metal container of 100 cm$^3$ volume with powder, repeating 180 gravity drops from a height of 2 cm, and measuring the bulk density of the powder.

The present invention also provides a method for preparing such a high-packing silicon nitride powder, comprising the steps of: reacting a metallic silicon powder having a mean particle size of about 1 to 10 $\mu$m, a BET specific surface area of about 1 to 5 m$^2$/g, and a purity of at least about 99% with nitrogen in a nitrogen atmosphere having a hydrogen concentration of about 5 to 20% by volume at a temperature of about 1,350° to 1,450° C., and milling the resulting silicon nitride powder in a dry agitating mill using balls as tumbling media.

DESCRIPTION OF THE PREFERRED EMBODIMENTS

The high-packing silicon nitride powder of the present invention should have a tap density of at least about 0.9 g/cm$^3$, preferably at least about 1.0 g/cm$^3$. Preferably, the powder contains at least about 95% by weight of particles having an aspect (length-to-breadth) ratio of up to about 3.

The silicon nitride base material from which the high-packing silicon nitride powder is obtained is not particularly limited although silicon nitride resulting from a direct nitriding method is often used. (The end silicon nitride powder is produced by milling any appropriate silicon nitride base material in a dry agitating mill using balls as tumbling media.) The direct nitriding method used herein is not particularly limited and any conventional one is useful. In order that the final silicon nitride powder have higher packing nature, it is preferred to prepare high-purity silicon nitride base material by the following method.

The source material is metallic silicon powder preferably having a mean particle size of about 1 to 10 μm, a BET specific surface area of about 1 to 5 m$^2$/g, and a purity of at least about 99%. Powder having a mean particle size of less than 1 μm is expensive and difficult to handle whereas powder having a mean particle size in excess of 10 μm is less reactive, leaving a larger proportion of the powder unreacted. Powder having a BET specific surface area of less than 1 m$^2$/g is less reactive, leaving a larger proportion of the powder unreacted whereas powder having a BET specific surface area of more than 5 m$^2$/g is too expensive and increased in oxygen content. A purity of less than 99% would result in a sintered body of low purity.

The metallic silicon powder is nitrided. Nitriding reaction can be effected by any conventional well-known direct nitriding method. Typical nitriding conditions include a temperature of about 1,350° to 1,450° C. and a time of about 1 to 5 hours. The reaction atmosphere is preferably a stream of a gas mixture of nitrogen and hydrogen, especially a mixture of nitrogen and hydrogen in a volume ratio of from about 5/95 to 20/80. The pressure preferably ranges from about 10 to 100 mmAq during reaction. The reaction furnace is generally a tunnel type pusher furnace or box type furnace although it not limited thereto.

Nitriding reaction yields silicon nitride which is first crushed by means of a jaw crusher or the like, and then pulverized by an air cyclone mill (ACM) or roller mill into a crude powder. This pulverized silicon nitride generally has a tap density of less than about 0.9 g/cm$^3$, contains less than about 50% by weight of particles having an aspect ratio of up to 3 and about 10 to 50% by weight of acicular particles, and includes about 0.1 to 0.5% by weight of iron, carbon, calcium, aluminum and other impurities. Such crude silicon nitride can be molded into a compact having a relatively low density of about 1.60 to 1.69 g/cm$^3$.

Figure 1:
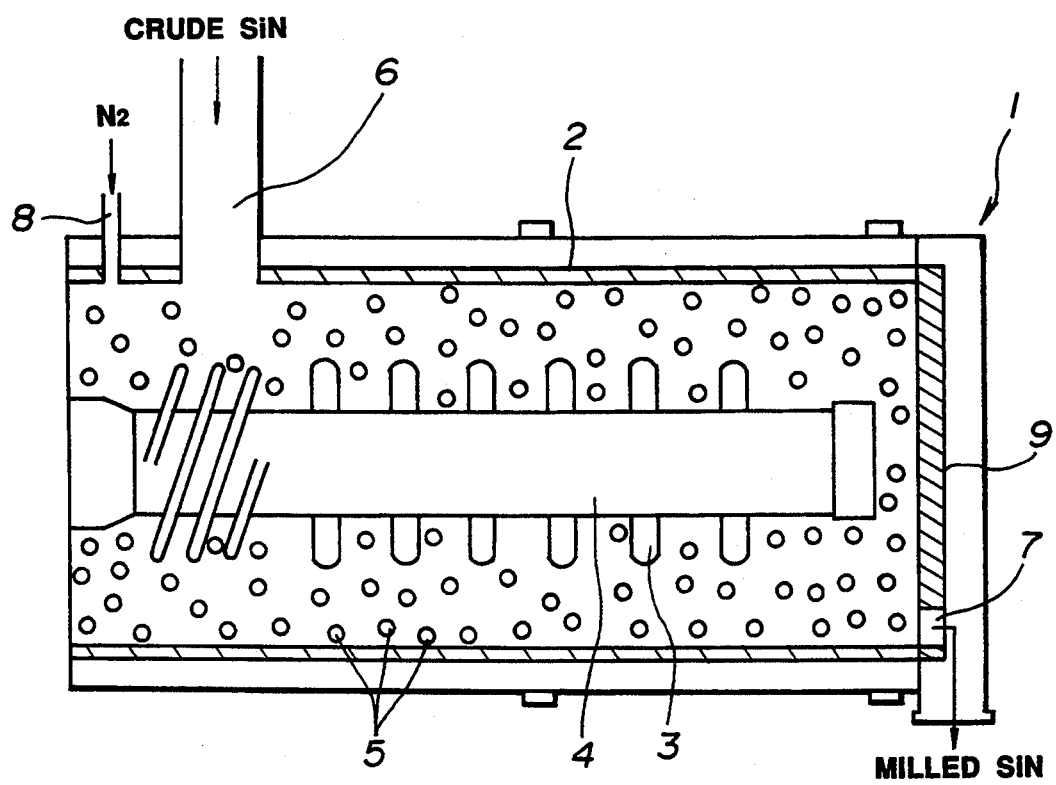
FIG. 1 is a schematic cross-sectional view of an exemplary dry attritor used in the method of the present invention.

The silicon nitride powder of the present invention is obtained by comminuting the crude silicon nitride powder containing acicular particles by means of a dry agitating mill. The dry agitating mills used herein include media-agitating mills such as roller mills and ball mills, jet mills, and compression grinding mills. Preferred mills capable of milling the powder so as to eliminate acicular particles are dry agitating mills using balls as tumbling media, for example, dry attritors. The dry attritor includes a fixed milling shell which is charged with small-diameter balls and a powder to be milled whereby the contents are forcedly agitated by means of agitating rods or rotating disks for comminution. One exemplary structure of the dry attritor is illustrated in FIG. 1.

The dry attritor 1 includes a horizontal cylindrical milling shell 2 charged with tumbling media in the form of balls 5, and a rotating arm 4 having a plurality of agitating rods for axially agitating the tumbling media 5. The arm 4 is rotatably received in the shell 2 for forcedly tumbling the balls 5. The crude silicon nitride powder is admitted into the shell 2 through an inlet port 6 at one end of the shell 2 where it is comminuted by means of the balls 5 and finally discharged out of the shell 2 through an outlet port 7 at the opposite end of the shell. The shell 2 is further provided with a nitrogen inlet 8 near the inlet port 6 for passing nitrogen gas through the shell, if necessary. The shell 2 near the outlet 7 is provided with a screen 9. Although a horizontal continuous attritor is illustrated, the dry attritor may be either vertical or batchwise. The balls used as the milling medium are hard, wear resistant, heat resistant ones made of metal or ceramic material, for example, balls of iron and silicon nitride.

The crude powder can be milled into a silicon nitride powder within the scope of the invention by means of a dry attritor while increasing its milling capability by supplying a powder charge equal to ½ to ¼ of the effective attritor capacity, for example, by setting a weight ratio of ball weight to powder charge of from 2/1 to 9/1 for silicon nitride balls.

The thus obtained silicon nitride powder is substantially free of acicular particles, has a tap density of at least about 0.9 g/cm$^3$ and contains at least about 95% by weight of particles having an aspect ratio of up to about 3. This silicon nitride powder is of high packing nature. If particles having an aspect ratio of up to about 3 do not reach 95% by weight of the overall powder, the powder would have a tap density of less than 0.9 g/cm$^3$, contain a noticeable amount of acicular particles, and be compacted into a compact having a density of less than 1.70 g/cm$^3$. The silicon nitride powder preferably has a mean particle size of about 0.4 to 0.7 μm as measured by means of a scanning electron microscope although accurate measurement thereof is difficult due to a measurement method and secondary agglomeration.

Preferably, the silicon nitride powder contains at least 80% by weight, especially at least 90% by weight of alpha-type silicon nitride because finally sintered parts with less than 80% by weight of alpha-type silicon nitride would have low strength. Also preferably the silicon nitride powder has a BET specific surface area of at least about 6 m$^2$/g, especially at least about 7 m$^2$/g because sinterability would be rather low with a specific surface area of less than 6 m$^2$/g. Further preferably, the silicon nitride powder contains up to 2%, especially up to 1.5% by weight of oxygen. Additionally, the silicon nitride powder preferably contains up to 0.6%, especially up to 0.4% by weight of carbon. The total of metal impurities other than carbon, for example, iron, aluminum, and calcium should preferably be up to 0.7%, especially up to 0.5% by weight. The oxygen, carbon, and metal impurity contents are so limited because beyond the limits, finally sintered parts would be low in strength.

EXAMPLE

Examples of the present invention are given below along with comparative examples by way of illustration and not by way of limitation.

Examples 1–5 & Comparative Examples 1–2

The source material used was metallic silicon powder having a mean particle size of 5 μm, a BET specific surface area of 2.5 m$^2$/g, and a purity of 99.5%. It was placed in a pusher type reactor where nitriding reaction took place in an atmosphere of a hydrogen/nitrogen gas mixture containing 15% by volume of hydrogen gas at 1,380° C. for one hour. The resulting silicon nitride was crushed by a jaw crusher and pulverized by an air cyclone mill.

The pulverized silicon nitride powder had an alpha silicon nitride content of 95% by weight, a BET specific surface area of 3.8 m$^2$/g, an oxygen content of 0.4% by weight, an aspect ratio 3 or less particle proportion of less than 50% by weight, an acicular particle proportion of 43% by weight, and a mean particle size of 22 μm.

Next, the powder was comminuted by a dry attritor as shown in FIG. 1 using silicon nitride balls (diameter 5 mm) as tumbling media. The milling capability was changed by varying the charge of silicon nitride powder to vary the ball/powder charge weight ratio.

The milled silicon nitride powder was measured for BET specific surface area, impurity contents (carbon and metal impurities), tap density, a proportion of aspect ratio 3 or less particles, and a proportion of acicular particles. The powder was CIP molded under a pressure of 1,000 kg/cm$^2$ into a compact which was measured for density. The tap density was measured by means of a powder tester available from Hosokawa Iron Works K.K. by charging a cylindrical metal container of 100 cm$^3$ volume with the powder, repeating 180 gravity drops from a height of 2 cm, leveling off extra powder above the top surface of the container by a blade, and measuring the weight of the container.

For comparison purposes, similar measurements were made on the silicon nitride powder before the dry attritor milling (Comparative Example 1) and a silicon nitride powder obtained by an imidizing method (Comparative Example 2). The results are shown in Table 1.

TABLE 1

|  | Synthesis | Ball/powder charge[1] | Particle size (μm) | BET (m$^2$/g) | Impurity content (wt %) Carbon | Impurity content (wt %) Metal | Tap density (g/cm$^3$) | Aspect ratio ≧3 particles[2] (%) | Acicular particles[3] (%) | Compact density (g/cm$^3$) |
|---|---|---|---|---|---|---|---|---|---|---|
| E1 | Direct nitriding | 8.6 | 0.68 | 10.1 | 0.15 | 0.12 | 1.16 | >99 | <1 | 1.80 |
| E2 | Direct nitriding | 5.0 | 0.57 | 8.7 | 0.15 | 0.12 | 1.14 | >99 | <1 | 1.78 |
| E3 | Direct nitriding | 3.7 | 0.69 | 7.3 | 0.15 | 0.11 | 1.13 | >98 | <1 | 1.75 |
| E4 | Direct nitriding | 2.7 | 0.69 | 6.4 | 0.15 | 0.11 | 1.12 | >97 | <1 | 1.78 |
| E5 | Direct nitriding | 2.1 | 0.70 | 6.1 | 0.25 | 0.14 | 0.90 | >99 | <1 | 1.78 |
| CE1 | Direct nitriding | — | 22 | 3.8 | 0.15 | 0.10 | 0.79 | <1 | 43 | 1.65 |
| CE2 | Imidizing | — | 0.6 | 9.5 | 0.11 | 0.08 | 0.68 | >99 | <1 | 1.60 |

Note:
[1] Ball/powder charge is the weight ratio of silicon nitride balls to a silicon nitride powder charge per hour.
[2] The percentage of particles having an aspect ratio of up to 3 was determined by using a scanning electron microscope (SEM) photograph and sampling 1,000 particles.
[3] The percentage of acicular particles was determined by using the SEM photograph and sampling 1,000 particles.

Figure 2:
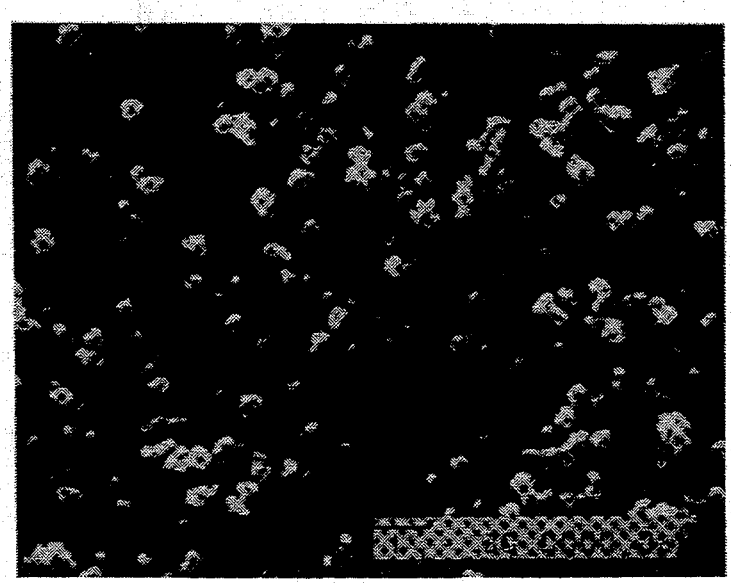
FIG. 2 is a photomicrograph of silicon nitride powder after milling (Example 1).
Figure 3:
FIG. 3 is a photomicrograph of silicon nitride powder prior to milling (Comparative Example 1).

FIGS. 2 and 3 are SEM photographs (×10,000 magnification) of the silicon nitride powders after milling (Example 1) and before milling (Comparative Example 1), respectively.

There has been described high-packing silicon nitride powder which has a high packing density and is thus moldable into a high density compact from which a sintered product having improved strength and dimensional precision is obtainable. The method of the present invention ensures manufacture of such high-packing silicon nitride powder.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. A silicon nitride powder having a tap density of at least about 0.9 g/cm$^3$, said tap density being the value obtained by charging a cylindrical container having a volume of 100 cm$^3$ with the powder to be measured, repeating 180 gravity drops from a height of 2 cm, and measuring the bulk density of the powder, said powder having a BET specific surface area of at least about 7 m$^2$/g, being substantially free from acicular particles and containing at least about 95% by weight of particles having an aspect ratio of up to about 3, said silicon nitride powder being obtained by milling a silicon nitride powder having a tap density of less than about 0.9 g/cm$^3$, containing less than about 50% by weight of particles having an aspect ratio of up to 3 and about 10 to 50% by weight of acicular particles and prepared by reacting a metallic silicon powder having a BET specific surface area of about 1 to 5 m$^2$/g with nitrogen, in a dry attritor including a fixed milling shell which is charged with balls as tumbling media and a powder to be milled whereby the contents are forcedly agitated by means of agitating rods or rotating disks for comminution.

2. A method for preparing a silicon nitride powder comprising the steps of:
reacting a metallic silicon powder having a mean particle size of about 1 to 10 μm, a BET specific surface area of about 1 to 5 m$^2$/g, and a purity of at least about 99% with nitrogen in a nitrogen atmosphere having a hydrogen concentration of about 5 to 20% by volume at a temperature of about 1,350° to 1,450° C., and milling the resulting silicon nitride powder having a tap density of less than about 0.9 g/cm$^3$, said tap density being the value obtained by charging a cylindrical container having a volume of 100 cm$^3$ with the powder to be measured, repeating 180 gravity drops from a height of 2 cm, and measuring the bulk density of the powder, and containing less than about 50% by weight of particles having an aspect ratio of up to 3 and about 10 to 50% by weight of acicular particles in a dry attritor including a fixed milling shell which is charged with balls as tumbling media and a powder to be milled whereby the contents are forcedly agitated by means of agitating rods or rotating disks for comminution, wherein the resulting silicon nitride powder has a tap density of at least about 0.9 g/cm$^3$, a BET specific surface area of at least about 7 m$^2$/g, and said powder being substantially free from acicular particles, and containing at least about 95% by weight of particles having an aspect ratio of up to about 3.

* * * * *